United States Patent
Konishi

(10) Patent No.: US 7,775,470 B2
(45) Date of Patent: Aug. 17, 2010

(54) RELATIVE LINE TENSION INDICATOR AND METHODS FOR FISHING REELS AND THE LIKE

(75) Inventor: M. Howard Konishi, Bothell, WA (US)

(73) Assignee: Macro Technologies, Inc., Kirkland, WA (US)

( * ) Notice: Subject to any disclaimer, the term of this patent is extended or adjusted under 35 U.S.C. 154(b) by 91 days.

(21) Appl. No.: 11/406,836

(22) Filed: Apr. 18, 2006

(65) Prior Publication Data
US 2007/0200023 A1    Aug. 30, 2007

(51) Int. Cl.
*A01K 89/01*    (2006.01)
(52) U.S. Cl. ...................................... 242/223
(58) Field of Classification Search ................. 242/223, 242/323
See application file for complete search history.

(56) References Cited

U.S. PATENT DOCUMENTS

| | | | | |
|---|---|---|---|---|
| 2,752,686 A | * | 7/1956 | Anderson et al. | 33/753 |
| 5,560,560 A | * | 10/1996 | Hirose | 242/223 |
| 6,561,033 B2 | * | 5/2003 | Nanbu et al. | 73/597 |
| 7,108,213 B2 | * | 9/2006 | Hitomi et al. | 242/223 |

\* cited by examiner

*Primary Examiner*—Emmanuel M Marcelo
(74) *Attorney, Agent, or Firm*—Graybeal Jackson LLP; Dylan O. Adams

(57) ABSTRACT

Relative line tension indicators and related methods particularly for fishing reels where the indicators include a body; a mechanical distance determining arrangement housed in the body, such as an axially translating probe shaft/actuator pin, or an electronic distance determining arrangement such as an optical distance determining integrated circuit; and a mechanical display arrangement, such as an indicator linked to the probe shaft/actuator pin, or an electronic display coupled to the distance determining arrangement. In select embodiments, the indicator is mounted to or integrated with the handle of a fishing reel, which is directly proximate to a line tension adjustment wheel. By determining and indicating the axial position of the adjustment wheel relative to an axially constant reference such as the reel handle, a user can determine where, along the continuum of relative positions, the adjustment wheel is positioned. By correlating this axial position with an actual drag value or level, the user can determine the relative over and under drag state from this reference.

17 Claims, 3 Drawing Sheets

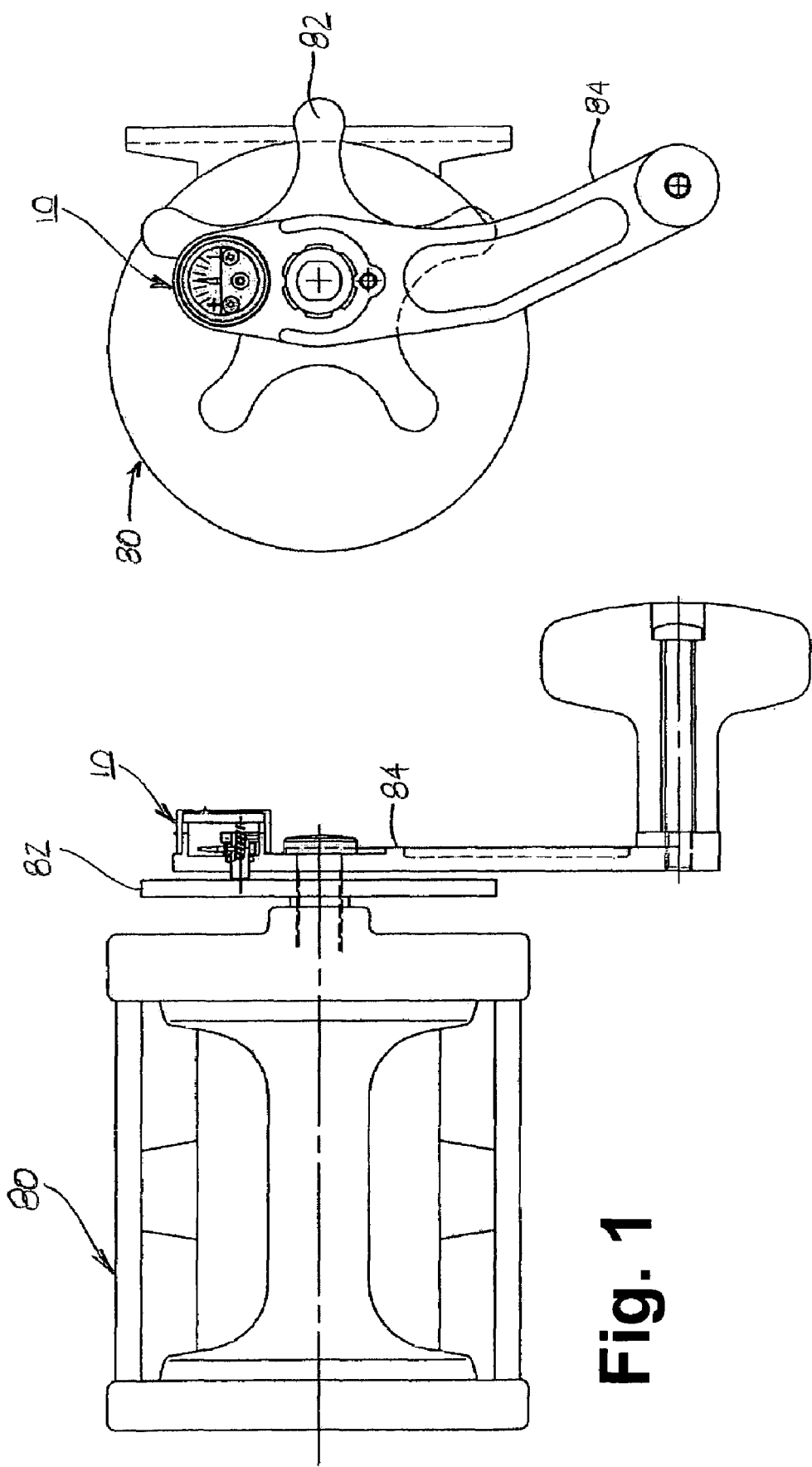

RELATIVE LINE TENSION INDICATOR AND METHODS FOR FISHING REELS AND THE LIKE

SUMMARY OF THE INVENTION

The invention is directed to an axial position indicator for use with conventional drag-type fishing reels to indicate the general tension state of the line drag, e.g., 1-5 pounds, 6-10 pounds, 11-15 pounds, etc. In star type drag fishing reels, a plurality of friction washers are rotationally mounted to a common threaded shaft. During operation of the reel, these washers are axially compressed between two surfaces, at least one being axially translatable and usually linked to a "star" adjustment wheel, which permits easy user adjustment. The second surface is preferably linked to the mechanical ground of the reel. Thus, when there is relative rotation between the washers and the surfaces, counter-rotation torque is provided to the rotating portion, which introduces the well-known drag on the line. By conveniently determining the relative axial position of the adjustment wheel to the mechanical ground, a relationship can be established between this distance and the drag tension.

In its most simplistic form, an axial position indicator according to the invention comprises a gauge set wherein a user repeatedly inserts at least one gauge having a predetermined thickness between the adjustment wheel and a mechanically grounded surface to determine the target distance. This approach is similar to methods used for determining the gap present in a spark plug or valve lash, but with respect to the adjuster wheel clearance. If the physical arrangement of the adjustment wheel and the reel permit, a user can also employ alternative distance gauging apparatus such as inside calipers and even linear measuring devices such as a ruler. However, such apparatus and methods do not provide a user with convenient feedback regarding the position of the adjuster wheel without requiring the user to re-establish the actual distance after adjustment of the adjustment wheel.

In a more robust embodiment of an axial position indicator according to the invention, a form of dial indicator is used. The indicator comprises a body, means at least partially housed in the body for determining a distance between the body and a proximately placed object, and means for communicating the distance to a user. The means for determining a distance can comprise a mechanical arrangement such as an axially translating probe shaft/actuator pin or an electronic arrangement such as an optical distance determining integrated circuit. The means for communicating the distance can comprise a mechanical arrangement such as an indicator linked to the probe shaft/actuator pin or an electronic display, e.g., an LCD, operatively coupled to the distance determining circuitry or analog to digital converter means that accepts motion input from the axially translating probe shaft/actuator pin. Those persons skilled in the art will appreciate that combinations of the above components can be made or substitutions also made.

In a preferred embodiment, the axial position indicator is mounted to the handle of the fishing reel, which is directly proximate to the adjustment wheel. Because an objective of the invention is to provide the user with information concerning the general or relative drag level of the adjustment wheel (as opposed to a precise representation of the actual drag being exerted on the reel drum), it is not necessary to provide an actual value of the imposed drag but instead to provide an indication of the approximate state of the adjustment wheel (relative position). Thus, by indicating the relative axial position of the adjustment wheel to an axially constant reference such as the reel handle, a user can determine where, along the continuum of relative positions, the adjustment wheel is positioned. By correlating this axial position with an actual drag value or level, the user can determine the relative over and under drag state from this reference. Moreover, by mounting the indicator to the handle, the means for communicating the distance between the handle and the adjustment wheel can be rapidly communicated to the user, since the handle is a highly visually exposed portion of the reel that is also adjacent to the adjustment wheel.

The axial position indicator of a preferred embodiment mounted to the reel handle specifically comprises a housing in which is disposed a dial indicator. Thus, the dial indicator includes a probe shaft or actuator pin that extends from the body, through the handle and contacts the adjustment wheel during normal operation of the reel. The probe shaft or actuator pin is captively held in the body but allowed to translate. The probe shaft or actuator pin is constructed to establish a cylindrical cam form, with an axially stationary indicator arm forming one cam follower as is well known in the art. Thus, upon axial translation of the probe shaft, that portion of the indicator arm acting as the cam follower transforms the reciprocating rectilinear movement of the probe shaft into proportional rotational movement of the indicator arm, as defined by the geometry and sweep of the cam groove or slot formed in the probe shaft.

In use, the fisher would adjust the drag setting to a known value using an extrinsic measuring device such as a weight scale, e.g., 33% of the rated breaking strength of the line being used, or to a desired setting. Then, the relative position of the indicator can be modified, such as by axially translating the indicator relative to the mechanical ground or by rotating a bezel having position indicia thereon, which results in the "zeroing" of the indicator to the predetermined drag setting. Such axial translation can be effected by a conventional threaded coupling arrangement, and held in relative position through friction or jam nut. In this respect, the fisher can know at all times the relative increase or decrease in drag setting from the zeroed value by mere inspection of the indicator.

BRIEF DESCRIPTION OF THE DRAWINGS

FIG. 1 is a partial cross section plan view of a preferred axial position indicator embodiment of the invention shown integrated into a fishing reel handle;

FIG. 2 is a side elevation view of FIG. 1;

DESCRIPTION OF THE PREFERRED EMBODIMENT

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show, but is to be accorded the widest scope consistent with the principles and features disclosed herein.

Turning then to the several drawings wherein like numbers indicate like parts, and more particularly to FIGS. 1 and 2, an embodiment of indicator 10 is shown integrated into reel 80. Unless otherwise noted herein, all referenced components are constructed from materials conventional to their intended use. Reel 80 is a conventional fishing reel having drag adjusting wheel 82, which acts upon a plurality of drag washers (not shown) as is well known in the art. However, instead of a conventional handle, reel 80 includes modified handle 84, which includes indicator 10 as shown. A user, therefore, need only replace the handle of the reel in order to realize the benefits of the invention. Such convenient replacement eliminates any retrofitting errors that may otherwise occur and ensures measurement consistency in that the adjusting wheel is usually precisely located adjacent to the OEM handle. Indicator 10 preferably has an operating range of 0.070".

Figure 3:
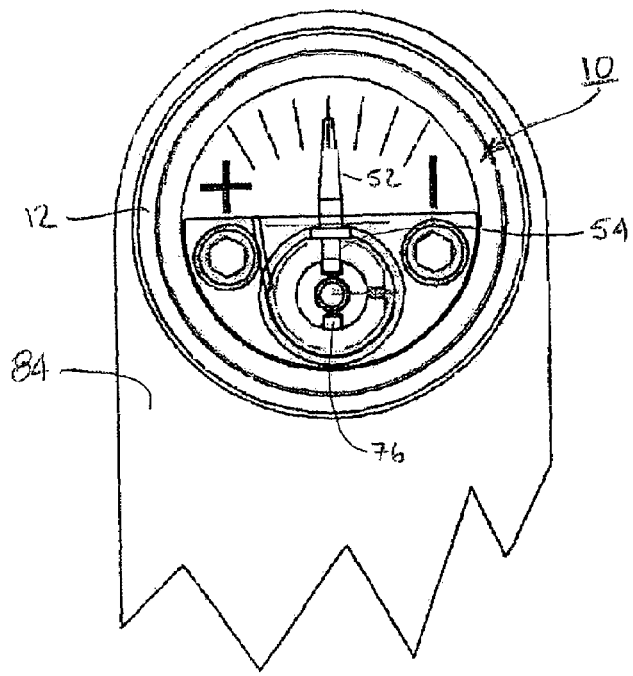
FIG. 3 is an isolated partial elevation view of the axial position indicator of FIG. 1.
Figure 4:
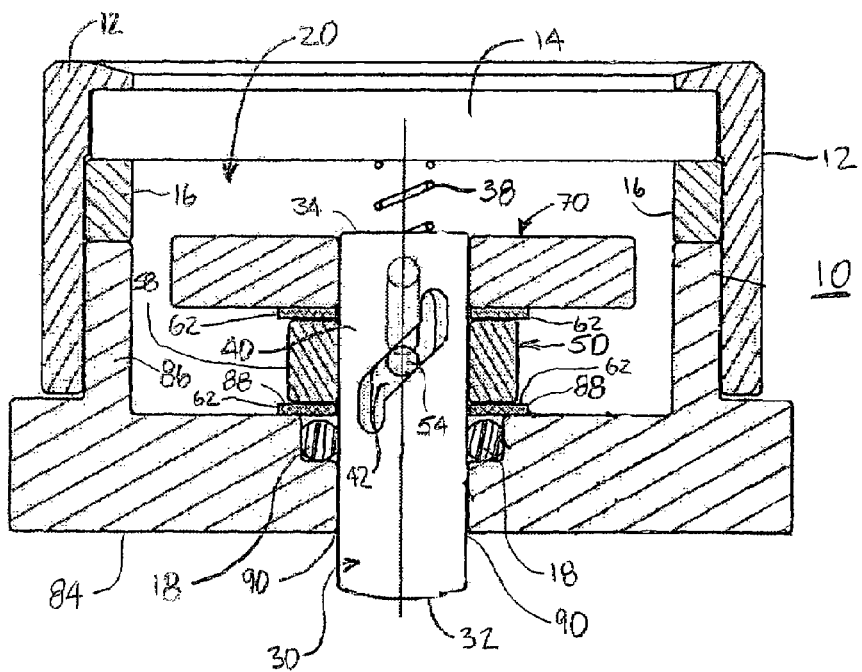
FIG. 4 is a detailed cross section side elevation view of the indicator of FIG. 1 taken along the line 4-4 of FIG. 3.
Figure 5:
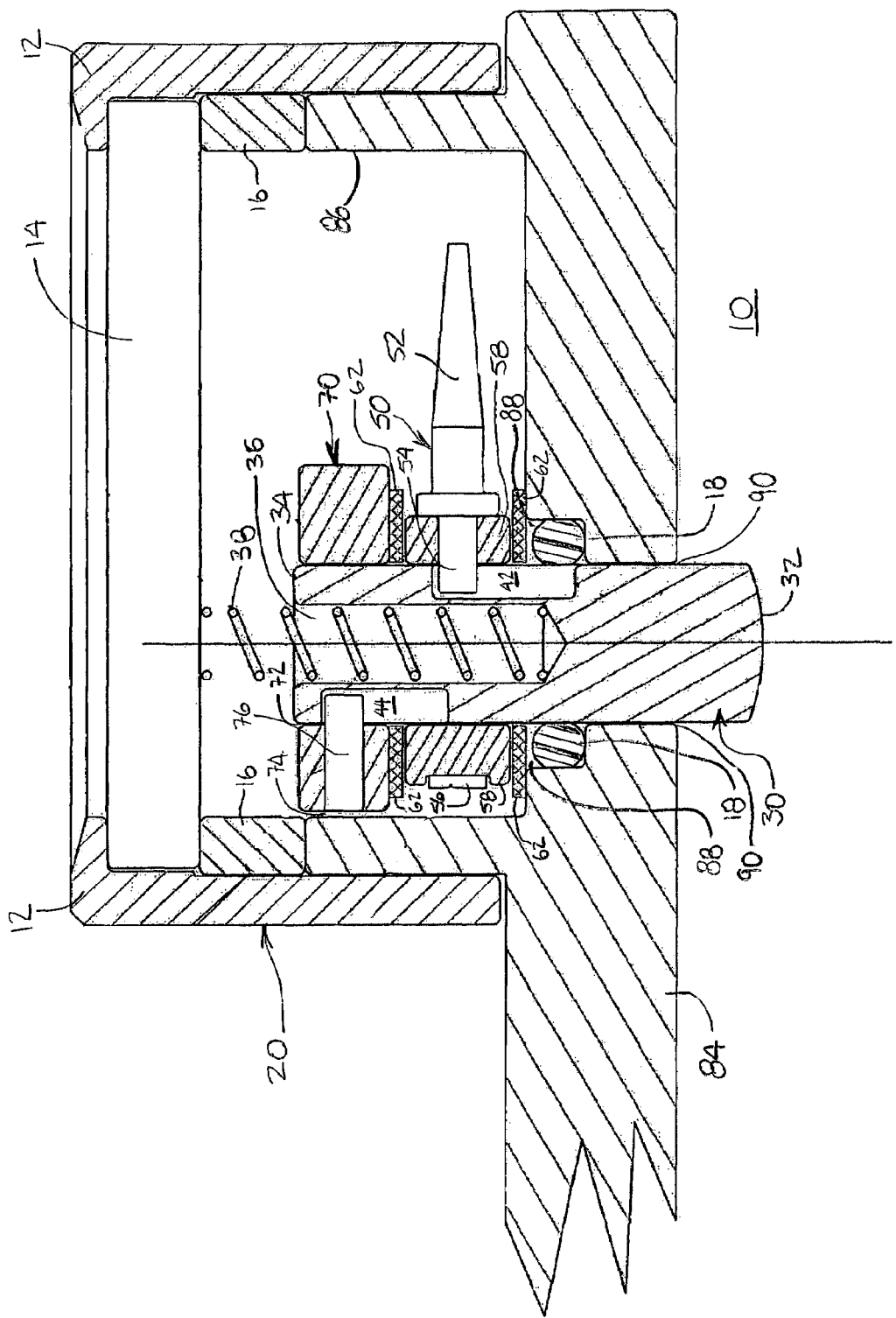
FIG. 5 is a detailed cross section side elevation view of the indicator of FIG. 1 taken along the line 5-5 of FIG. 3.

As best shown in FIGS. 3-5, indicator 10 comprises raised cylindrical perimeter 86, first recess 88, bore 90, bezel 12, sight glass 14 and gasket 16. Together, these structures define a housing for measuring apparatus 20 of indicator 10. As noted earlier, those persons skilled in the art will appreciate that the indicator need not be integral with handle 84 but may be removably linked to it such as by threads or attached to it by way of swaging, welding or adhesive.

Indicator 10 thus comprises measuring apparatus 20, which includes probe or actuator pin 30, pointer assembly 50, and bridge assembly 70. Probe 30 includes contacting end 32 (also considered the distal end) and receiving end 34 (also considered the proximal end). Located at receiving end 34 is bore 36, which is sized to securely receive one end of compression spring 38. Spring 38 operates, in conjunction with sight glass 14, to impart a bias in actuator pin 30 towards distal end 32, which corresponds to little or no line drag tension. In addition, actuator pin 30 includes body portion 40, which defines helical slot 42 and linear slot 44. Helical slot may be truly helical or may be a rectilinear approximation of a helix. As will be described in detail below, the interaction between this slot and pointer assembly 50 will translate axial movement of actuator pin 30 into rotational movement of indicator arm 52. By varying the sweep of helical slot 42, the degree of indicator arm 52 movement can be established. Linear slot 44 operates in conjunction with guide pin 76 to restrict rotation of actuator pin 30 and limit axial movement thereof, as will also be described below.

Pointer assembly 50 includes indicator arm 52, which includes pin 54, return spring 56, carrier 58 and thrust washers 62. Actuator pin 30 resides in bore 60 formed in carrier 58, thereby permitting axial translation of actuator pin 30 but limiting lateral movement thereof. Surrounding carrier 58 is return spring 56, which is mechanically grounded thereto and terminates at indicator arm 52 at the other end. By this arrangement, a crude fulcrum arrangement is created with the distal end of indicator arm 52 being one end, and pin 54 at the other end. Pin 54 cooperative engages helical slot 42 of actuator pin 30, and by axial translation of actuator pin 30, pin 54 is caused to laterally translate. This lateral translation is in turn transformed into pivotal or rotary motion of indicator arm 52 through the fulcrum point established by return spring 56 thereat. Return spring 56 further functions to minimize axial movement of indicator arm 52, that may be incident to pin 54's interface with helical slot 42 during operation of indicator 10. Thrust washers 62 further arrest all lateral movement of actuator pin 30.

To prevent unintentional rotation of actuator pin 30, bridge assembly 70 is provided. As with carrier 58, bridge assembly 70 includes axial bore 72, which is sized to translationally receive actuator pin 30. In addition, bridge assembly 70 includes lateral bore 74, which is sized to frictionally receive guide pin 76 such that it depends into linear slot 44 of actuator pin 30. In this manner, all meaningful rotation of actuator pin 30 is arrested. Furthermore, because linear slot 44 is closed-ended, the range of axial translation of actuator pin 30 is limited. In this manner, over extension and compression of actuator pin 30 is prevented.

Both pointer assembly 50 and bridge assembly 70 are mechanically grounded, such as to handle 84. To prevent undesired ingress of contaminants, o-ring seal 18 is provided in first recess 88.

During operation, calibration of indicator 10 can be accomplished by adjusting the spacing between indicator 10 and adjusting wheel 82, i.e., the axial displacement. This adjustment will thereby modify the relative position between indicator arm 52 and the indicator indicia. Thus, indicator 10 can be "zeroed" with respect to any established drag level. Once zeroed, the drag can be modified at will (such as after landing a fish and during the fight) and returned to the zeroed position thereafter without having to again determine the amount of drag, such as by direct measurement with a scale. A preferred means for carrying out this axial displacement is by way of threaded coupling between the indicator housing and handle 84, with the relative position being maintained though the use of friction or a jam nut.

While the foregoing represents the presently preferred embodiment for determining the relative position of an axially movable object such as adjusting wheel 82, it is to be understood that any means for determining such information is considered within the scope of the invention.

What is claimed is:

1. An indicator for assessing the relative distance between a rotatable lever arm and an adjacent object wherein the lever arm has a first location for receiving a shaft of a rotatable element and defines an indicator mounting position, the indicator comprising:
   a body having a presentation side and a reverse side wherein at least a portion of the reverse side is exposed to the adjacent object during rotation of the lever arm about the rotatable element;
   measurement means at least partially housed in the body for determining a distance between the body and the adjacent object; and
   communication means for communicating the determined distance.

2. The indicator of claim 1 wherein the lever arm defines a bore having a first orifice and a second orifice, and the reverse side of the body further includes a projecting portion sized to at least partially pass through the first orifice.

3. The indicator of claim 2 wherein at least a portion of the measurement means is housed in the projecting portion of the body.

4. The indicator of claim 3 wherein the measurement means comprises a translatable actuator pin defining a groove and a pointer pin partially occupying the groove wherein the actuator pin extends from the reverse side of the body and the pointer pin moves in response to translation of the actuator pin.

5. The indicator of claim 1 wherein at least a portion of the reverse side is directly and constantly exposed to the adjacent object.

6. The indicator of claim 1 wherein the measurement means comprises a mechanical linkage.

7. The indicator of claim 6 wherein the measurement means comprises a translatable actuator pin defining a surface groove and a pointer pin partially occupying the surface groove wherein the actuator pin extends from the reverse side of the body and the pointer pin moves in response to translation of the actuator pin.

8. The indicator of claim 7 wherein the measurement means further comprises indicia for providing context to the pointer pin, the indicia being independently rotatable relative to the pointer pin to permit calibration of the indicator.

9. The indicator of claim 7 wherein the measurement means further comprises an axial extension bias element to urge the actuator pin outward from the body and overextension means for preventing escape of the actuator pin in response to the provided bias.

10. The indicator of claim 1 wherein the measurement means comprises an electronic sensor comprising a transmitting element, a receiving element, a processor and a driver for creating a digitally encoded signal, and the communication means comprises a visual display operatively coupled to the driver for presenting the digitally encoded signal.

11. A method for determining the tension drag of a line wound around a drum rotating about a shaft, which defines an axis, wherein the drum comprises at least one axially translatable friction element, and an axially translatable adjusting element whereby the degree of line drag is modified by varying the axial distance between the friction element and the adjusting element, the method comprising:
    establishing a spatial position that is constant in the axial direction;
    measuring the distance between the adjusting element and the spatial position to obtain a first value;
    causing the adjusting element to change its axial position; and
    measuring the distance between the adjusting element and the spatial position to obtain a second value.

12. The method of claim 11 further comprising measuring the actual line drag after obtaining the first value, and measuring the actual line drag after obtaining the second value.

13. The method of claim 12 further comprising establishing a scale by extrapolating from the first and second measurements, and the first and second values.

14. The method of claim 12 further comprising measuring a plurality of distance values and a corresponding plurality of actual line drag measurements to establish a scale through extrapolation.

15. The method of claim 11 wherein the spatial position is at a location on a lever arm operatively coupled to the shaft of the drum.

16. In a system comprising a drum having a line wound there about and rotatable about a shaft, which defines an axis; at least one friction element disposed about the shaft, and operatively coupled to the drum; and an axially translatable adjustment element operatively coupled to the at least one friction element, an indicator for assessing the relative distance between the adjustment element and a spatial position that is constant in the axial direction during operation of the drum, the indicator comprising:
    a body located at the spatial position;
    measurement means at least partially housed in the body and exposed to the adjustment element to obtain distance data there between; and
    communication means for communicating the determined distance.

17. The indicator of claim 16 wherein the spatial position is rotatable about the shaft axis.

* * * * *